United States Patent
Blackwell et al.

(10) Patent No.: US 10,033,208 B2
(45) Date of Patent: Jul. 24, 2018

(54) CONTROLLING A SMOKE DETECTOR BY REGULATING BATTERY VOLTAGE

(71) Applicant: Roost, Inc., Sunnyvale, CA (US)

(72) Inventors: James Blackwell, Los Gatos, CA (US); Roel Peeters, San Carlos, CA (US)

(73) Assignee: Roost, Inc., Sunnyvale, CA (US)

( * ) Notice: Subject to any disclaimer, the term of this patent is extended or adjusted under 35 U.S.C. 154(b) by 51 days.

(21) Appl. No.: 15/369,565

(22) Filed: Dec. 5, 2016

(65) Prior Publication Data
US 2017/0331308 A1 Nov. 16, 2017

Related U.S. Application Data

(60) Provisional application No. 62/335,479, filed on May 12, 2016.

(51) Int. Cl.
| | |
|---|---|
| G08B 21/00 | (2006.01) |
| H02J 7/00 | (2006.01) |
| G08B 21/18 | (2006.01) |
| G08B 29/18 | (2006.01) |
| G08B 17/10 | (2006.01) |

(52) U.S. Cl.
CPC .......... *H02J 7/0047* (2013.01); *G08B 21/182* (2013.01); *G08B 29/181* (2013.01); *H02J 7/007* (2013.01); *H02J 7/0029* (2013.01); *H02J 7/0063* (2013.01); *G08B 17/10* (2013.01); *H02J 2007/004* (2013.01); *H02J 2007/005* (2013.01); *H02J 2007/0067* (2013.01); *H02J 2007/0096* (2013.01)

(58) Field of Classification Search
CPC ..... G08B 19/005; G08B 21/18; H02J 7/0029; H02J 2007/0095

USPC .......... 340/636.15, 628, 632, 636.1
See application file for complete search history.

(56) References Cited

U.S. PATENT DOCUMENTS

| | | | |
|---|---|---|---|
| 5,686,896 A | 11/1997 | Bergman | |
| 5,914,656 A * | 6/1999 | Ojala | G01D 4/004 340/521 |
| 7,508,314 B2 * | 3/2009 | Andres | G08B 17/00 340/635 |
| 8,159,361 B2 | 4/2012 | Lontka | |
| 8,558,708 B2 | 10/2013 | Albert et al. | |

(Continued)

OTHER PUBLICATIONS

International Search Report and Written Opinion dated Jul. 19, 2017, International Patent Application No. PCT/US2017/031601, filed May 8, 2017, 12 pages.

*Primary Examiner* — Phung Nguyen
(74) *Attorney, Agent, or Firm* — Davis Wright Tremaine LLP; Philip H. Albert

(57) ABSTRACT

A controlled battery includes a housing shaped in order to fit inside a battery compartment of an electrical device. The housing includes mechanical connectors on an exterior surface of the housing, adapted to couple to conventional battery electrical terminals of the electrical device. The controlled battery further includes an energy storage, such as a battery, inside the housing which stores energy and a voltage regulator which delivers a voltage to the mechanical connectors of the controlled battery from the energy storage, the voltage configured to be a consistent output voltage that does not deviate from a characteristic output voltage of the controlled battery until the energy storage is substantially depleted of energy.

10 Claims, 5 Drawing Sheets

(56) References Cited

U.S. PATENT DOCUMENTS

| | | | |
|---|---|---|---|
| 2009/0102672 A1* | 4/2009 | Petek | G08B 29/181 |
| | | | 340/636.15 |
| 2010/0073174 A1 | 3/2010 | Dufour | |
| 2015/0022368 A1 | 1/2015 | Smith et al. | |
| 2015/0042484 A1* | 2/2015 | Bansal | G06F 1/3212 |
| | | | 340/693.3 |
| 2015/0084780 A1* | 3/2015 | Palmer | H02J 3/02 |
| | | | 340/693.1 |
| 2016/0093924 A1 | 3/2016 | Peeters et al. | |

* cited by examiner

CONTROLLING A SMOKE DETECTOR BY REGULATING BATTERY VOLTAGE

CROSS-REFERENCE TO RELATED APPLICATION

This application claims priority to U.S. Provisional Patent Application No. 62/335,479, filed May 12, 2016, entitled "CONTROLLING A SMOKE DETECTOR BY REGULATING BATTERY VOLTAGE," which is hereby incorporated herein by reference.

BACKGROUND

Compact sensors have many uses, such as door, state, temperature, and/or acceleration sensors that might be inexpensively deployed, perhaps in a communications network. Typically, some sensors require some processing, communications capability and a power source to be nearby the sensor. In some applications, that power source is a battery and the sensor usage and lifetime are such that available battery power can be exhausted and need battery replacement. In some aspects, traditional sensors may provide certain methods of warning a user of a low-battery state of the device, such as chirping sounds from a smoke detector.

The minimum duration of such a chirping period may be dictated by regulations, laws, other rules, or consumer expectations. In order to allow for different battery chemistry, smoke detectors may be configured to chirp for significantly longer than this minimum duration when using most batteries. This may be inefficient and result in batteries being changed earlier than is necessary.

It would be useful to modify the timing of the warning to account for other factors, so that the warning can be triggered later than it would otherwise and/or earlier than it would otherwise.

SUMMARY

In some aspects, the present disclosure provides a controlled battery for use in a device with a limited interface where the behavior of the device is altered by simulating battery output changes. The controlled battery includes an energy storage element and logic for controlling that energy storage element. In a specific embodiment, the controlled battery fits into a smoke detector and provides the power expected by the smoke detector at a battery power input of the smoke detector. A processor of the controlled battery, depending on its program instructions, may cause the battery voltage output to go above a current voltage level that would otherwise be provided by the energy storage element, may cause the battery voltage output to be approximately equal to the current voltage level that would otherwise be provided by the energy storage element, and/or may cause the battery voltage output to go below the current voltage level that would otherwise be provided by the energy storage element.

One outcome of causing the battery voltage output to go above the current voltage level that would otherwise be provided by the energy storage element might be to delay the triggering of a chirping battery replacement signal of the device being powered. One outcome of causing the battery voltage output to go below the current voltage level that would otherwise be provided by the energy storage element might be to trigger the chirping battery replacement signal of the device being powered in advance of when it would otherwise occur.

The processing to determine how to alter the output of the energy storage element might come entirely from internal computations made by a processor of the controlled battery, or might take into account instructions obtained or communicated from an external data source, such as a remote server. For example, a cloud computer server might maintain a state for a purchaser of the controlled battery and allow the purchaser to remotely request that the chirping be initiated or remotely delay the chirping.

The controlled battery includes mechanical connectors on an exterior surface of the housing, the mechanical connectors adapted to couple to conventional battery electrical terminals of an electrical device and an energy storage element inside the housing that stores energy. In some embodiments, the controlled battery is not enclosed in a unitary housing, but is formed in two housings, one for the energy storage element, wiring, and possibly a sensor, along with electrical connections for supplying power to the electrical device being powered and electrical and mechanical connectors for connecting to a second housing that contains the processor and other elements.

The controlled battery further may include a voltage regulator that delivers electricity at a voltage to the mechanical connectors from the energy storage, wherein the voltage regulator regulates the voltage to be a consistent output voltage that does not deviate from a characteristic output voltage of the controlled battery until the energy storage is substantially depleted of a first reserve of energy.

The voltage regulator may be configured to maintain the characteristic output voltage of the controlled battery until the energy storage is substantially depleted of the first reserve of energy, and then to maintain a second output voltage for a first duration of time using a second reserve of energy. The first duration of time may be a period of time based on one or more regulations or laws. The second output voltage may be below a low battery warning voltage of the electrical device.

One aspect of the present disclosure provides a method of controlling a smoke detector by regulating an output voltage from a controlled battery, the method including outputting a first voltage from the controlled battery, the first voltage being a voltage sufficient to operate the smoke detector without putting the smoke detector into a low battery warning state, determining that the controlled battery lacks sufficient power to continue to supply the first voltage to the smoke detector, and, in response to determining that the controlled battery lacks sufficient power, supplying a second voltage from the controlled battery, the second voltage being a voltage that would cause the smoke detector to go into a low battery warning state for at least a first duration of time.

In another aspect, the controlled battery could be controlled to drop the output voltage of the controlled battery for various reasons, such as to trigger a device to issue a low battery warning, such as a chirp from a smoke detector, where other methods of initiating the low battery warning are not enabled.

DETAILED DESCRIPTION

For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In embodiments of controlled batteries explained herein, a controlled battery might combine an energy source and processing and/or communications capability into a particular form factor, can be used to provide a compact controlled battery that can communicate with other controlled batteries and external sources, such as remote servers over an Internet connection. Examples of such controlled batteries might be those described below.

A controlled battery as described herein offers alternative manners of alerting a user of a low battery state as might be needed in a smoke detector or other controlled battery. Because of alternative low-battery warning, more efficient modes of operation may enable a controlled battery to operate for longer periods of time than a traditional battery. In addition, the controlled battery can trigger a low-battery warning earlier than otherwise might be necessary.

In some aspects, the output from the energy source of the controlled battery may be altered in order to communicate with, or alter the operations of, the other controlled battery that is powered using the energy source. For example, the controlled battery may be configured to fit into a 9 V battery position on another controlled battery, such as a smoke detector. The controlled battery may be configured to output a certain voltage, in order to convey or not convey certain messages to or through the smoke detector. Generally, a smoke detector may be configured to emit a low-battery chirping sound intermittently when it is provided a certain range of voltages, while operating without such an intermittent chirping at other voltages. For example, a smoke detector may operate perfectly at voltages above 7.5 V, or operate fine below that but nonetheless emit a low-battery chirping sound intermittently at voltages of approximately 5 V to 7.5 V, and may not operate at all under approximately 5 V.

Figure 1:
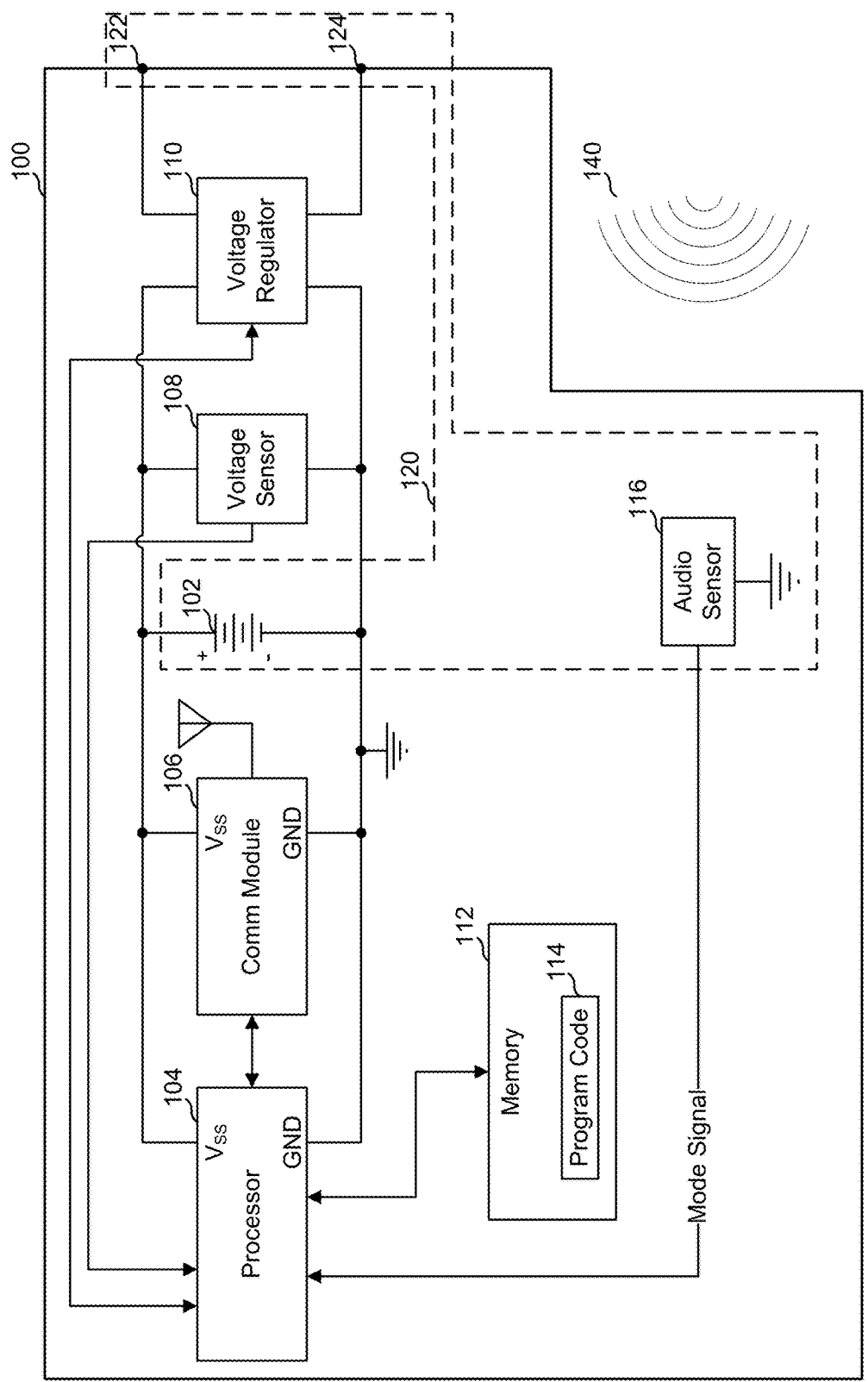
FIG. 1 is a block diagram of a controlled battery according to some aspects of the present disclosure.

FIG. 1 is a block diagram of a controlled battery 100 according to some aspects of the present disclosure. Controlled battery 100 is shown comprising an energy source 102, a processor 104, a communications module 106, a voltage sensor 108, a voltage regulator 110, a memory 112 including storage for program code 114, an audio sensor and a positive battery terminal 122, and a negative battery terminal 124. Controlled battery 100 might comprise a first housing, an energy storage housing 120 (illustrated with dashed lines in FIG. 1) and a processing housing enclosing the elements of controlled battery 100 not enclosed in energy storage housing 120. Audio sensor 116 is able to pick up audio signals from various sources external to controlled battery 100, such as a smoke detector audio signal 140.

Controlled battery 100 might include in the first housing an opening for sound entry so sound can more easily reach audio sensor 116, but this is not required.

In some embodiments, audio sensor 116 is able to absorb enough power from the audio signal to generate a mode signal to wake up processor 104 without audio sensor 116 needing any other source of power. Audio sensor 116 might also be used for receiving initial configuration information to allow communications module 106 to be configured to communicate with external networks. Communications module 106 might have its own internal storage for configuration variables, such as network ID (e.g., SSID, ZigBee node info, etc.), passphrases, encryption types, etc., or those configuration variables might be stored in memory 112.

Communications module 106 might comprise an antenna and/or some control logic and analog circuit elements. Energy source 102 might be a battery, a rechargeable cell including, for example, a lithium cell, or other battery using a number of different chemical compositions. In other variations, processor 104 is replaced with a simpler control circuit. Processor 104 can be a microprocessor or microcontroller or system on a chip, as appropriate.

As shown, processor 104 is coupled to communications module 106, voltage sensor 108, voltage regulator 110, memory 112, and audio sensor 116. In this manner, processor 104 can read program code 114 from memory 112 and execute instructions to perform various functions described herein and/or to have processor 104 embody various means and/or structural elements described herein. For example, processor 104 could, when executing particular instructions, implement a smoke detector monitor/controller.

Being coupled to communications module 106, processor 104 can cause the sending and reception of data, such as over a wireless network. An antenna might be part of communications module 106 or a separate element. Such a communication path might allow for processor 104 to convey state information to a user associated with controlled battery 100 by conveying data over a wireless network where that data is in packets addressed to a server or other destination device that is in turned programmed to send messages to a particular portable device or smartphone that has been registered with the server or other destination device as being associated with controlled battery 100.

In some cases, it might be that the user device associated with controlled battery 100 is distinct from the person or persons occupying the space where controlled battery 100 is in use. For example, controlled battery 100 might be in use in a residence and the messages go to a caretaker of the resident(s). As another example, controlled battery 100 might be in use in a residence because a tenant installed controlled battery 100 in that residence, but subsequently the tenant moved out and controlled battery 100 remained in place. In the latter case, it might be useful for the user of the user device to force an early low-battery signal, to prompt the new resident to pay attention to controlled battery 100 and replace it and/or reconfigure it.

Energy source 102 might be a compact 9 V battery, a 5 V battery, or a battery of another voltage. In some embodiments, the combination of the two housings is such that they together are compatible with a chamber for a 9 V battery or other standard battery chamber or enclosure. As shown, energy storage housing 120 can have terminals that are compatible with existing batteries, such as 9 V standard battery terminals. In a preferred embodiment, controlled battery 100 is usable as an exact replacement for a battery in a smoke detector or other electrical device that does not have communication capability but would benefit from communication capability.

Each of processor 104, communications module 106, voltage sensor 108, and voltage regulator 110 are shown coupled to energy source 102 for their operating power. Memory 112 might be as well, although not shown. Audio sensor 116 might consume power from energy source 102, but in some embodiments, that is not necessary. By being coupled to voltage sensor 108, processor 104 can determine a current output voltage of energy source 102. Program code instructions would provide the appropriate instructions for program actions based on the current output voltage, as explained herein elsewhere. By being coupled to voltage regulator 110, processor 104 can alter, based on program instructions, the output voltage that voltage regulator 110 applies across battery terminals 122, 124.

Preferably, processor 104 has a sleep mode and an awake mode, wherein power consumption is reduced in the sleep mode relative to the awake mode. Processor 104 might switch from the sleep mode to the awake mode in response to a signal received at a mode signal input from audio sensor 116, which is preferably a passive sound sensor. Audio sensor 116 might comprise a piezoelectric transducer. If the location of controlled battery 100 is inside or near a smoke detector or other alarm signaling device, the typical minimum sound level requirement for such detector/devices, and the form of the signal, the sound energy impinging on audio sensor 116 in an alarm condition might be sufficient energy to generate the mode signal without needing any other electrical power. By taking advantage of the piezoelectric property that the transducer can generate a voltage when excited by an audio signal, and the minimum sound levels expected at audio sensor 116, as well as the level of detail needed from the signal, controlled battery 100 can remain in its deepest sleep state, without the need to periodically wake-up to monitor the audio.

In a specific embodiment, a smoke detector has an alarm sound generator, such as a speaker that can generate an 85 dB alarm sound. Given the proximity of controlled battery 100 to the speaker, audio sensor 116 can generate enough excitation energy on its own to provide the mode signal, a voltage waveform that wakes processor 104. Once awake, processor 104 can monitor both the frequency and waveform period to determine if the cause of the wake-up was a real alarm. For example, processor 104 might maintain a set of lookup parameters that are compared to a continuing signal received at its mode signal input.

For ease of implementation, audio sensor 116 might be an audio transducer selected to have a resonant frequency close to, or at, the generated frequency of the alarm to increase the amplitude of the resulting output voltage waveform.

For many smoke detectors, the frequency and waveform of its audible alert is standard, such as those defined by ANSI specification ANSI/ASA S3.41-1990 (R2008) (Audible Emergency Evacuation Signal). ANSI specification ANSI/ASA S3.41-1990 (R2008) requires a specific pattern— referred to as "Temporal Three's". This pre-defined pattern can be used to validate that the alarm is being generated by the smoke alarm.

To minimize false triggers, the period and the frequency of the alarm can be learned during an installation process. As part of the installation, the user might be requested to press an alarm "test" button. This would trigger the smoke alarm and processor 104 can use audio sensor 116 to learn both the frequency and pattern of the alarm. Later, this can be used as a base comparison to compare against any future alarms.

Thus, if there were a match, processor 104 would send an alarm signal to communication module 106, which could then wirelessly transmit a corresponding message signaling the alarm.

Figure 2:
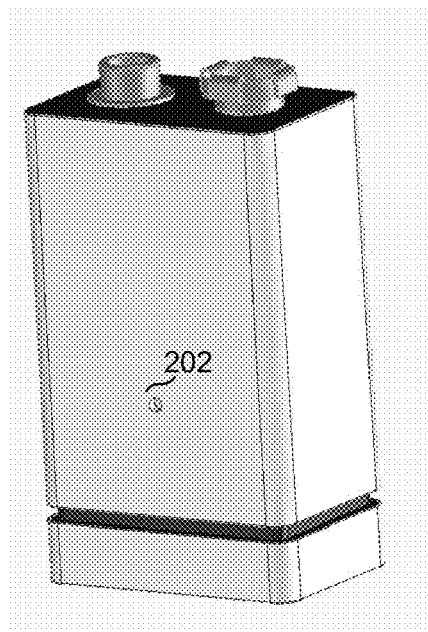
FIG. 2 is a side view of an embodiment of the controlled battery.

FIG. 2 illustrates the energy store housing of the controlled battery attached with the processor housing, with terminals for electrical energy transfer and an opening 202 to accommodate audio sensor 116 (not shown).

Figure 3:
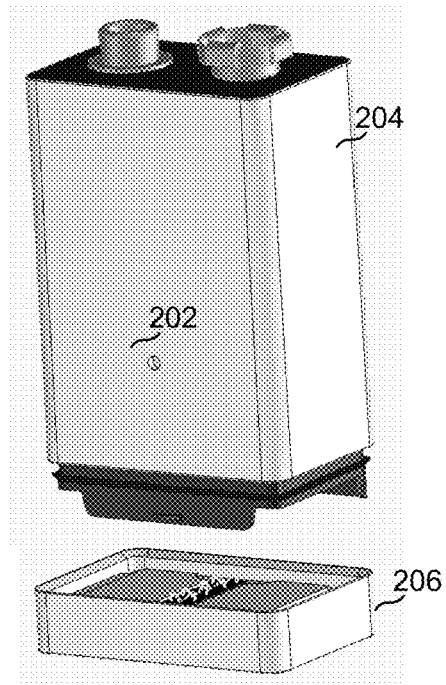
FIG. 3 is a side view of an embodiment of the controlled battery similar to FIG. 2, but showing an energy store housing of the controlled battery separated from a processor housing of the controlled battery.

FIG. 3 illustrates the energy store housing 204 separated from the processor housing 206 and also shown a connector for power and communication between the two housings. Separate housings make it simple for end users to separately replace components. For example, if the energy store is not rechargeable, energy store housing 204 can be replaced with a fresh energy store without having to replace the processor portion of the controlled battery. Also, if there is a need to replace the processor portion, such as where a specific processor portion is not usable in a certain environment or jurisdiction, it can be swapped out for one that is usable. The spatial relationship between the positive battery terminal and the negative battery terminal might be in compliance with standards for 9 V batteries, as well as the combined housings being compatible.

Generally, a typical battery may have a characteristic voltage curve over time. This curve may be based on a number of factors, such as the usage of the battery and the chemical composition of the battery.

Figure 4:
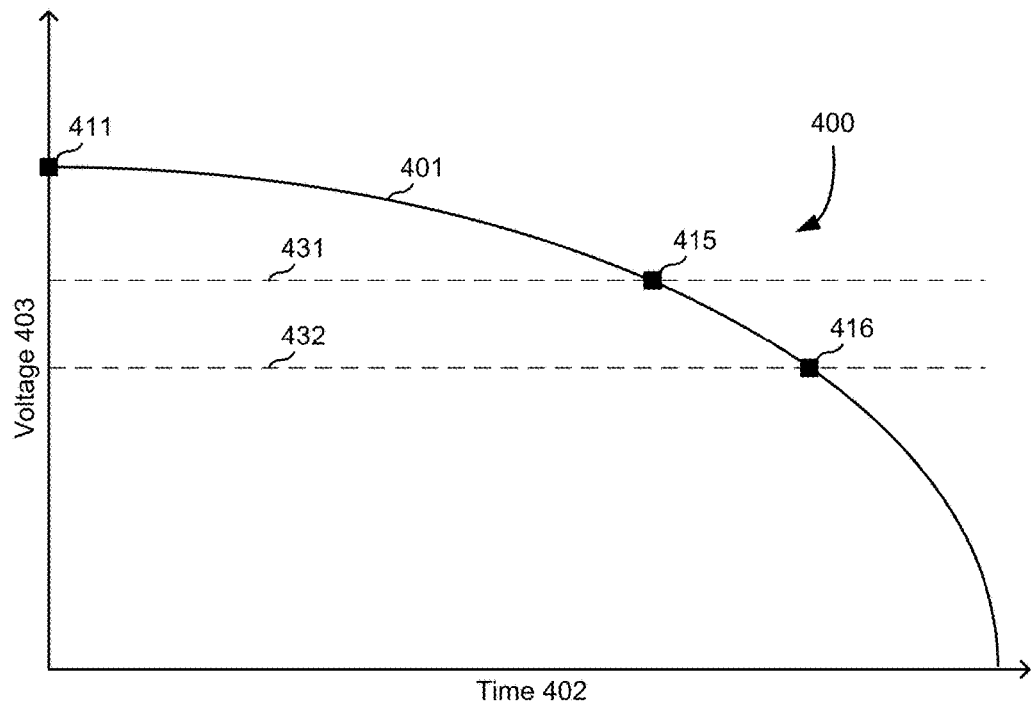
FIG. 4 illustrates an exemplary characteristic voltage curve for the energy store and/or conventional batteries.

FIG. 4 is an illustration 400 of a characteristic voltage curve 401 for a traditional battery. Illustration 400 is merely exemplary, and does not reflect the actual operation of any specific battery. As shown there, a voltage 403 of a battery, represented by a voltage curve 401, varies over time 402. It may be assumed that during the time period in question, the battery is being used at a relatively constant rate, such as might be typical in a low-drain controlled battery such as a smoke detector. In such a controlled battery, the controlled battery may draw a low amount of power at a constant rate over a relatively long period of time, although a much higher amount of power may be used when the controlled battery is sounding an alarm. Outside of alarm states, however, power consumption may be low and constant. The illustrated voltage curve 401 may occur during such low-drain usage. Voltage curves similar to voltage curve 401 may occur in a number of low-drain controlled batteries, such as controlled batteries like battery-powered clocks and watches, e-readers, and other controlled batteries. The shape of the voltage curve 401 may vary, such as being convex, concave, linear, or more complex shape with multiple changes in voltage. However, the voltage curve 401 may generally transition from an initially high voltage and lessen over time, until the battery is dead and no longer able to maintain any voltage.

As illustrated by voltage curve 401, at a time 411 when the battery is first installed into a controlled battery, the voltage may be at a high level. For example, the voltage of a 9 V battery may be approximately 9 V. This voltage may continue at or about 9 V for some period of time when the battery is new. For example, the voltage of the battery may very slowly decline from 9 V or may maintain a voltage of 9 V for some period of time. The shape of the voltage curve 401 generally may be related to, among other factors, the power usage of a controlled battery and the chemical composition of the battery. After some period of time, a battery's voltage may decline as a faster pace, as the battery loses power, and may eventually reach 0 V, given enough time.

Generally, a controlled battery, such as a smoke detector, may be able to operate within a certain range of voltages. For example, a smoke detector that uses a 9 V battery may be able to operate in a range from 9 V down to approximately 5 V. In some aspects, the low operating voltage of a smoke detector may be, for example, 3.5 V, 4 V, 4.5 V, 5 V, 5.5 V, 6 V, or another voltage. In FIG. 4, a low operating voltage 432 of an exemplary controlled battery is represented. The low operating voltage 432 of a controlled battery may represent a voltage below which the controlled battery may not operate, or may not operate up to a certain standard. For example, in a smoke detector, the low operating voltage 432 may be the voltage at which a battery may not have enough battery power to sustain an "alarm" signal for more than some period of time, such as for more than four minutes. This period of time may be based on an applicable standard or regulation.

Prior to when a battery runs out, a controlled battery, such as a smoke detector, may be configured to alert a user that the controlled battery is running out of battery power. This alert may be given in the form of an intermittent chirp, or through another method such as a flashing light on the controlled battery. The smoke detector or another controlled battery may determine that it is running out of battery power based on a received voltage from the battery. For example, a smoke detector that operates using a 9 V battery may be configured to have a low-battery signal, such as an intermittent chirp, based on a received voltage of under, e.g., 7.5 V. This voltage may be referred to as a low battery warning voltage 431, as shown in FIG. 4. An audio sensor of the controlled battery might be used to provide feedback as to the chirping or other expected sound from the device powered by the controlled battery. For example, a processor in the controlled battery can trigger a low voltage to initiate a chirp sequence and then check, using the audio sensor, that the chirping is actually occurring.

The low battery warning voltage 431 may be based, at least in part, on the low operating voltage 432 of a particular controlled battery. For example, the low battery warning voltage 431 will be higher than the low operating voltage 432, and may be configured to provide a certain amount of warning to a user that the battery is running out of power. The low battery warning voltage 431 may also be determined, such as by a manufacturer of a controlled battery, in order to provide a warning of sufficient duration based on a standard, such as UL 217. The duration of this warning is the duration of time between time 415, when the controlled battery begins a low battery warning, and time 416, when the controlled battery no longer has enough battery power to operate. This warning duration may be dictated by applicable standards, and the low battery warning voltage 431 may be based on a certain warning duration, given known power usage of the controlled battery and known characteristics of the relevant batteries, such as 9 V batteries.

In some aspects, a smoke detector may need to provide two weeks of low-battery "chirping," where at the end of that two week period, the smoke detector will still have enough power to maintain a smoke alarm signal for four minutes. These requirements may be based on relevant standards. Generally, different batteries may have different voltage curves. Because of this, the low battery warning voltage 431 may be set to a higher voltage that might be necessary to conform to the standard under normal usage. For example, the low battery warning voltage 431 may be set to a voltage that usually provides a four-week or longer warning duration, in order to account for variations in battery voltage curves between different batteries.

It may be observed that voltage curve 401 is an inefficient use of power in a battery of a smoke detector in two different ways: by operating at a voltage higher than in necessary during the life of the battery, and by having a user replace the battery weeks in advance of when the battery actually has insufficient power to power the controlled battery. For example, all power provided in excess of low battery warning voltage 431 may be unnecessary, and a user may replace a battery at the beginning of the warning duration, at time 415, rather than waiting until time 416.

Generally, the low battery chirp of a smoke detector may be annoying to a user, which is intended to force the user to replace the battery of the controlled battery. Because the low battery warning voltage 431 is higher than is strictly necessary, some amount of power in the battery may be wasted because the user changes a battery prior to a time when the battery would actually run out of power, even when allowing for the requirement that the battery be able to reserve sufficient power to sense smoke and chirp for a two week period. For example, a user may replace a battery when the smoke alarm begins to "chirp" at the low battery warning voltage 431 at time 415, rather than replacing the battery when the power reaches the low operating voltage 432 at time 416. There may be four weeks or more between time 415 and time 416, and therefore, weeks of useful power from the battery may be wasted.

Further, additional power may be wasted because the battery typically provides more power (a higher voltage) to the controlled battery than is strictly necessary to power the controlled battery. For example, the battery may be installed in the controlled battery at time 411, and the battery at this point may provide an initial amount of power. For example, in a smoke detector with a 9 V battery, the battery when it is initially installed at time 411 may provide 9 V. However, it may be observed that the smoke detector actually requires a lesser voltage to operate, namely the low operating voltage 432 of the battery. Because the smoke detector provides a low battery warning below the low battery warning voltage 431, operating above this voltage may be advantageous.

Generally, it may be observed that a time plot of voltage from a battery, such as voltage curve 401, may not be linear. However, given enough time, the plot trends downwards from the initial voltage at time 411 until reaching 0 V.

The voltage regulator 110 may be configured to deliver an output voltage that does not deviate from a characteristic output voltage of the controlled battery until energy source 102 is substantially depleted. For example, the voltage regulator 110 may be configured to deliver a consistent voltage to the battery terminals 122, 124 until energy source 102 is nearly depleted. At that time, voltage regulator 110 may be configured to deliver a lowered voltage to the battery terminals 122, 124 for a given duration. This duration may be dictated by laws or regulations, such as regulations that indicate how long a smoke detector must sound a low battery warning signal such as a chirp.

In some aspects, voltage regulator 110 may be a circuit element without external logic, or may be controlled, at least in part, by processor 104 or another element of the controlled battery 100. For example, voltage regulator 110 might have an input for programming to output a different output voltage to the battery terminals 122, 124 for different applications, such as when the controlled battery 100 is placed into different smoke detectors. Different smoke detectors may have different power requirements, and different threshold voltages, such as low battery warning voltages and low battery voltages. Accordingly, the controlled battery 100 and the voltage regulator 110 may be configured to operate differently in different smoke detectors or other electrical devices, such as by being programmable to output different characteristic output voltages and different lower voltages, based on where the controlled battery 100 is installed and how it may be programmed. In some aspects, for example, the controlled battery 100 may be programmable to set the characteristic output voltage and the lower voltage, as well as setting a duration that the controlled battery 100 may maintain the lower voltage.

Figure 5:
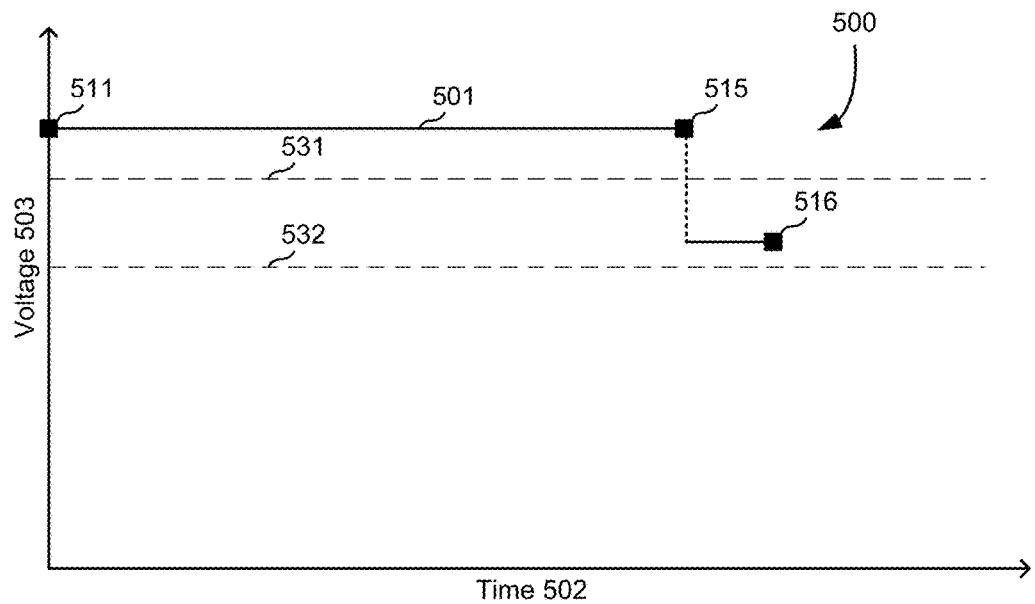
FIG. 5 illustrates an exemplary voltage curve of an output of the controlled battery with a voltage regulator according to some aspects of the present disclosure.

FIG. 5 is an illustration 500 of an exemplary voltage curve 501 of a controlled battery according to some aspects of the present disclosure. The controlled battery may be configured to communicate wirelessly with other controlled batteries, nearby computers, routers, or other networking equipment, and with the cloud. These communications may use wireless communications protocols such as Wi-Fi, cellular communications, Bluetooth communications, or another wireless communications protocol. Because the controlled battery may transmit information on its own, the controlled battery may be configured to transmit low battery alerts to a user in manners other than using a smoke detectors chirping functionality. For example, the controlled battery may communicate with a household cloud or connected home in order to provide a user with information about the battery status in a manner that is much more convenient, and less annoying, to a user than a chirping smoke detector. The controlled battery or the cloud may be configured to, for example, automatically alert a user when the controlled battery is running low on power, and may be configured to, for example, order a replacement when needed.

The controlled battery may also be configured to reduce that power that is wasted as described above. Power may be wasted in two different ways: First, a conventional battery may make a smoke detector "chirp" for a longer period than is necessary, resulting in the battery being replaced prior to such a replacement being necessary. Second, a conventional battery may deliver power at a higher voltage than is needed to operate the smoke detector during the life of the battery and waste power in this manner. However, the controlled battery described herein may be configured to regulate its output voltage in a manner to reduce both of these inefficiencies of traditional batteries.

The controlled battery may use a voltage regulator to regulate an output voltage, in order to minimize the amount of time where a smoke alarm may be below the low battery warning voltage 531. For example, the controlled battery may be configured to fall below the low battery warning voltage 531 at time 515, when the controlled battery lacks sufficient power to remain above this voltage, or when the controlled battery lacks sufficient power to maintain a voltage above the low battery voltage 532 for a given amount of time. In some aspects, a smoke detector may need to remain in a low battery "chirping" state for at least two weeks based on certain standards. Accordingly, the controlled battery may be configured to drop below the low battery warning voltage 531 at a time such that the controlled battery can maintain a voltage above the low battery voltage 532 for a given period of time. The controlled battery may also be configured to not drop below the low battery warning voltage 531 until it is unable to maintain a voltage above the low battery warning voltage 531.

Alternatively, controlled battery 100 may be configured to accept instructions wirelessly over a remote network to intentionally drop below the low battery warning voltage 531 so as to trigger early user action. If controlled battery 100 is able to determine local time of day, such as via wireless network communications, controlled battery 100 might be programmed to time the dropping below the low battery warning voltage 531 to be during waking hours so as to not chirp in the middle of the night.

In this way, the controlled battery may use a voltage regulator to extend the time between a battery being installed and the time the smoke detector begins to "chirp," and may conserve power by enabling the controlled battery to be used for longer in the smoke detector. The controlled battery may be configured to alert a user of a low battery condition in ways other than an annoying smoke detector chirping, such as by using wireless communications to communicate with a cloud. This might enable a user to be notified of a low power condition in a number of ways, such as using electronic mail, using an app, using software on a computer, or other methods. In addition, the user can be informed of a future anticipated low power condition, allowing for the user to schedule in advance a battery replacement. This can be useful where the user requires planning to replace a battery, such as hiring a handyperson, borrowing a ladder, calling an able-bodied friend, etc.

Further, the controlled battery may also save power by refraining from delivering excess power to a smoke detector or another device. For example, a smoke detector may be designed to operate well, without low battery warnings, at any voltage above 7.5 V or another voltage. When such a smoke detector is receiving an output voltage of higher than 7.5 V, such as 9 V, more energy may be consumed from the battery than is necessary to power the smoke detector. Accordingly, it may be advantageous to use a voltage regulator to deliver a voltage to the smoke detector that enable the smoke detector to work without "chirping," but not to an excessive voltage which might result in wasted energy. Therefore, a voltage regulator in a controlled battery may enable energy savings in at least two ways: by enabling the controlled battery to be used for a longer period of time than a traditional battery, and by delivering a more efficient, lower voltage during the operational life of the controlled battery. Therefore, from time 511 onwards, the controlled battery may be configured to deliver a voltage that is higher than low battery warning voltage 531, but that may not be as high as might be delivered initially by a traditional battery.

Accordingly, the controlled battery may be configured to reduce the amount of time between time 515 and time 516, relative to the amount of time between time 415 and time 416 on FIG. 4, when using a traditional battery. This reduction may be obtained by using a voltage regulator on the controlled battery to maintain a voltage above low battery warning voltage 531 for a longer period of time. There may be a minimum amount of time between time 515 and time 516 that is mandated by appropriate standards, laws, regulations, or other rules, such as UL 217. However, this mandated duration may be significantly shorter than the duration of time between time 415 and time 416 on FIG. 4. That is, the warning duration illustrated in FIG. 5 may be significantly shorter than that in FIG. 4. It may be safe to minimize the warning duration for a controlled battery instead of a traditional battery, due to communications capabilities found in the controlled battery which can alert users of a low-battery state in other ways than those found in a smoke detector.

Figure 6:
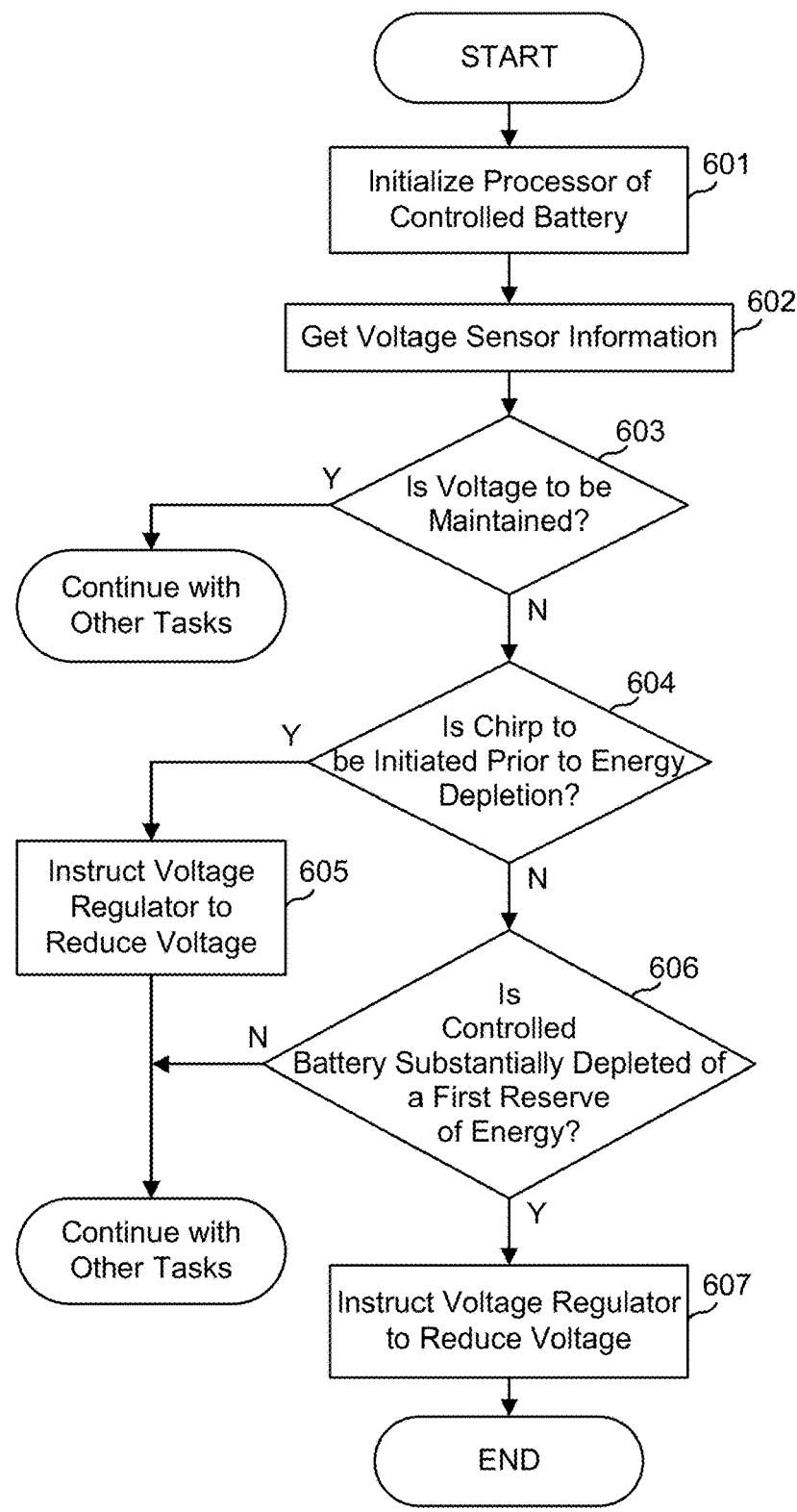
FIG. 6 is a flowchart of a process for controlling a controlled battery and its voltage output.

FIG. 6 is a flowchart of a process for controlling a controlled battery and its voltage output. As shown there, a process might begin at step 601 by initializing a processor. The method described herein, and the steps performed, might be performed by logic circuits and/or a processor programmed according to program instructions stored on a tangible computer-readable medium. At steps 602, the processor obtains voltage sensor information, such as from a voltage sensor. In some instances, the voltage sensor is combined with a voltage regulator or a voltage regulator is otherwise able to report its input voltage to the processor.

The processor then determines at step 603 whether an action is to be taken or if the present output voltage is to be maintained. If so, the process continues with the processor performing other tasks. If the present output voltage is to be modified, the process continues at step 604, where the processor determines whether the output voltage is to be dropped so as to initiate a chirping process or other device-dependent low-voltage activity. This might occur where the processor receives instructions to initiate a chirping process or determines, based on time of day or other factors, that a low-voltage signal would be shortly needed anyway for safety reasons and preferentially initiates the chirping process early. In that case, at step 605, the processor instructs the voltage regulator to drop to a voltage known to induce the chirping process or other device-dependent low-voltage activity. The voltage to which the voltage regulator is to drop might be stored in memory as a variable.

Once the output voltage is dropped, the processor can continue with other tasks. If, at step 604, the processor determines not to intentionally drop the output voltage, it proceeds to step 606 and determines whether to instruct the voltage regulator to maintain a voltage relative to an output voltage of an energy source (if there is sufficient reserves to maintain the battery) or to instruct the voltage regulator to reduce the voltage (if there are not sufficient reserves to maintain the battery and a chirping is to be triggered or allowed to occur), the processor sends those instructions at step 607 and the process completes, or repeats from the beginning.

Using this process, the processor can delay the chirping when appropriate and can accelerate the chirping when appropriate, for optimal battery use. For example, the processor can delay the chirping when the processor determines that the battery does not need to be replaced, by instructing or controlling the voltage regulator so that the output voltage to the smoke detector or other device is higher than a chirp triggering voltage even if the battery would otherwise output that lower voltage. The processor can accelerate (advance) the chirping when the processor determines that the battery should be replaced for external reasons or other reasons unrelated to battery energy availability and voltage output ability, by instructing or controlling the voltage regulator so that the output voltage to the smoke detector or other device is lower than a chirp triggering voltage even if the battery would otherwise output a higher voltage.

The processor can also include sensors that detect the chirp, so that the processor can control the voltage, lower the voltage below the chirp threshold and listen for the chirp, as a closed-loop testing process, wherein the lowered voltage would cause an electrical device powered by that battery to react to the lowered voltage at the battery terminals. This would allow the processor to determine whether the battery it is controlling is installed in a smoke detector or other device, or whether the processor-controlled battery is not being used or is somewhere else. Where the processor is able to communicate with remote services, for example, a home occupant might remotely request that a smartphone app determine if the processor-controlled battery is actually installed in a working smoke detector. The smartphone app might send a message over the Internet or other network to the processor instructing the processor to initiate an "install test." In response to that instruction, the processor would control the voltage regulator such that the voltage regulator drops the battery's output voltage below the chirp threshold—but not so low that the smoke detector or other device lacks power to chirp—and then the processor monitors a sound sensor until the chirp is detected or a timeout occurs. The processor can then restore a voltage above the chirp threshold and then send a message to the remote service indicating whether (a) a chirp was detected during the install test, indicating that the processor and the battery it controls is actually installed, or (b) that no chirp was detected. The latter would indicate that the battery is installed in another device that doesn't chirp as expected, that the battery is not installed, and/or that the device is not working properly.

Figure 7:
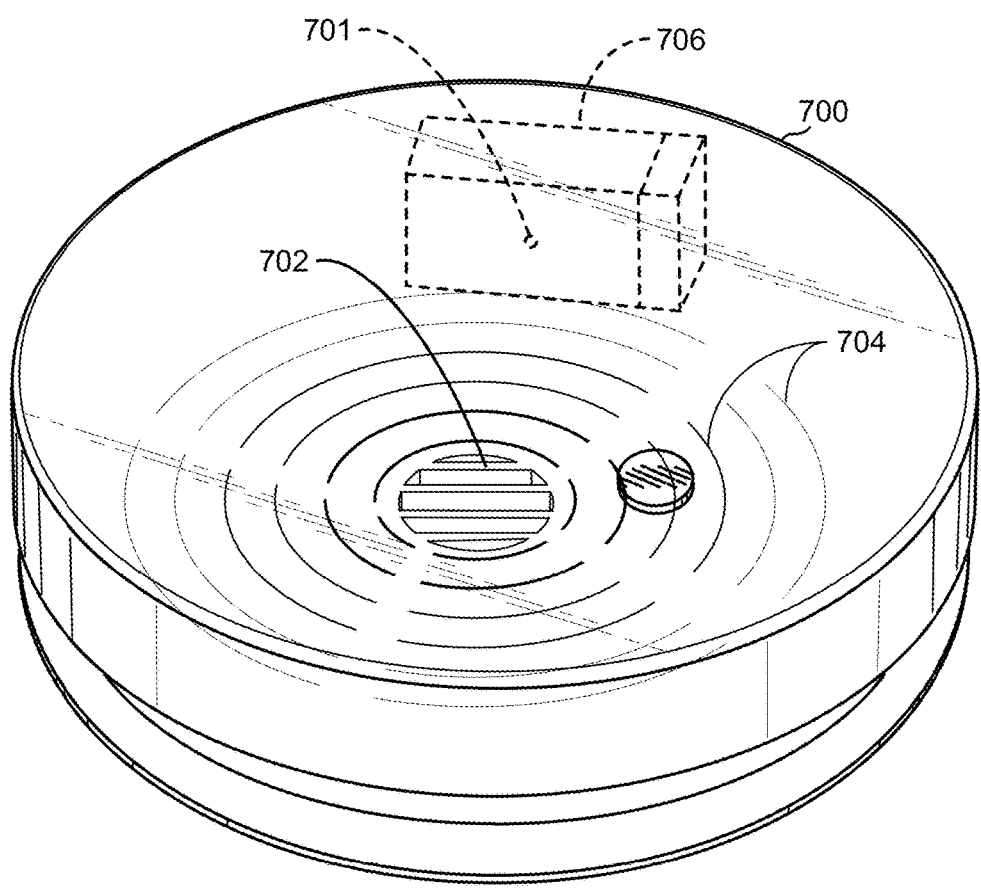
FIG. 7 is a front view of a smoke detector that might use the controlled battery of FIGS. 1-3.

FIG. 7 is a front view of a smoke detector that might use the controlled battery of FIGS. 1-3 within a conventional smoke detector housing. As illustrated there, smoke detector 700 has a battery compartment that might otherwise house a conventional 9 V battery. In its place is a controlled battery 706, as described herein. An audio sensor opening 701 provides for sound waves 704 generated by an alarm emitter 702 to easily enter controlled battery 706. Audio sensor opening 701 is situated near enough to alarm emitter 702 so that sound waves 704 are sufficient to power the audio sensor therein.

The controlled battery might also be used in other applications, such as a carbon monoxide detector or other alarm condition signaling system. The controlled battery might be used with various battery form factors, such as 9 V, AA, AAA, ½ AA, N, or other form factors.

Using the above concepts, users of controlled batteries and sellers of such controlled batteries or sellers of combined battery/communications elements might have the systems set up so that alarm conditions can be detected without significant quiescent power drain.

Other examples where the communications elements might find usefulness include gas/water/fire sensors, garage door open/closed sensors, door opening (e.g., front door, medicine or liquor cabinet door) sensors, temperature sensors, and the like.

Because the expansion tabs are interchangeable, a very flexible sensor network can be implemented using these controlled batteries.

In some sensor networks, other data is taken into account. For example, a sensor might be employed onto a door that should not be opened if person A is not within range of that door. An alarm app would then send an alarm to person A's smartphone if the external information indicates that person A is out of range and not send an alarm if person A is determined to be within range. The external information might be provided as a form of geofencing.

Many other scenarios can be supported by the sensor network. For example, hours of operation might be included in the other data taken into account. This might allow for selective notification, such as where a user chooses to only be notified if the door is opened during a particular timeframe, e.g., while they are out of the house at work.

The sensor network may have a user interface. The user interface can be provided over an Internet Protocol (IP) interface. For example, one or more controlled batteries in the sensor network may operate as HTTP servers, and a smartphone, computer or other web-enabled controlled battery can be used to present that user interface to a user. In some aspects, this interface may be presented using a browser of the web-enabled controlled battery. More generally, a communications interface is provided that is capable of receiving data from, and/or sending data to, a data source/destination external to the controlled battery and external to the electrical device that is powered by the controlled battery.

Alternatively, a smartphone app with a web API might be used so that the sensor network does not have to be shipped or sold with a specific display and input means. The user interface can provide display data, such as messages, sensor status, indications of whom or what is being sensed, and other information. For example, the user interface might show display data filtered by at least some of information obtained from the sensor network and/or from an external information source. The display data might vary based on who is sensed as being present near the sensor network and/or how many people are present, or whether predetermined users are present. The sensor network might include, or be connected to, a communications hub for more centrally controlling and managing communications between sensor elements and the HTTP server or other user interface.

In some aspects, the controlled battery described above may use communications capabilities to provide other functionality to a device. Generally, a controlled battery may not offer a formal control interface. For example, the controlled battery may take the appearance of a battery that might power another device. Accordingly, the controlled battery may be configured to offer some control of a battery-powered product.

In general, the control offered by the controlled battery may include altering the voltage or the current of the power supplied by the controlled battery. For example, a controlled battery may offer a feature which might reduce or change the voltage of the controlled battery, which may be referred to as a "self-test" feature. This feature might allow the controlled battery to test whether a "low battery" sensor on a powered device (which the controlled battery is inserted into) is operating properly. In some aspects, the controlled battery may also a mode in which the voltage to a powered device is turned off, or a "snooze" feature.

Generally, these controlled battery features including power control may be useful in a large number of devices, in addition to their use in smoke detectors. For example, a device may be powered up only between certain times to either preserve battery life or to limit product use. Such limited product use might be useful in a controlled battery that is used to power a child's toy, for example.

In some aspects, the controlled battery may include a number of sensors. For example, the controlled battery may include a motion sensor. Accordingly, the controlled battery may be configured to alter the provided power based upon input from a sensor. For example, the controlled battery may be configured to "power up" when it detects movement. Such a controlled battery may be useful in a number of situations, such as in a children's toy, or in other forms of battery-powered controlled batteries that wait for human interaction.

Other scenarios may also be possible. For example, certain battery-powered devices may draw a low current when they are not in use. In that case, it may be advantageous for the controlled battery to provide a low voltage during those times, but when the battery-powered device is moved or used, while providing a higher current or voltage at other times when the device requires. Accordingly, the battery may be configured to increase its voltage based on input from sensors.

In some aspects, signals received from the cloud, such as the Internet, may also be used to provide functionality to the device. For example, signals from the cloud may be used to alter the voltage or current provided by the controlled battery. In some aspects, a controlled battery may be configured to turn a device on or off, such as by switching the voltage from a non-zero voltage to zero voltage, based on signals received from the cloud or another source.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A controlled battery for powering an electrical device comprising:
    a processor;
    memory, capable of storing program instructions for the processor thereon;
    a communications interface, capable of receiving data from a data source external to the controlled battery and external to the electrical device;
    an energy source;
    battery terminals that provide power to the electrical device to the controlled battery, the power being provided external to the controlled battery;
    a voltage regulator, coupled to the processor, capable of regulating an output voltage provided to the battery terminals; and
    computer-readable medium containing instructions to modify the output voltage to delay or accelerate a low battery condition, wherein the low battery condition is a state of the controlled battery and the battery terminals designed to cause the electrical device to react to a lowered voltage at the battery terminals.

2. The controlled battery of claim 1, further comprising:
    a processor housing for housing at least the processor, the memory, the computer-readable medium, the communications interface, and the voltage regulator; and
    an energy storage housing, adapted to be coupled to the processor housing, the energy storage housing for housing at least the energy source.

3. The controlled battery of claim 2, wherein the energy storage housing is further adapted to house an audio sensor and includes an opening for sound entry.

4. The controlled battery of claim 3, further comprising the audio sensor for detecting sounds emitted by the electrical device being powered by the controlled battery.

5. The controlled battery of claim 3, wherein the processor housing and the energy storage, when coupled together, are compatible with a standard battery chamber.

6. The controlled battery of claim 1, wherein the voltage regulator is adapted to deliver electricity at a voltage to the battery terminals from the energy source, wherein the voltage regulator regulates the voltage to be a consistent output voltage that does not deviate from a characteristic output voltage of the controlled battery until the energy source is substantially depleted of a first reserve of energy.

7. The controlled battery of claim 6, wherein the voltage regulator is adapted to deliver electricity at the voltage to the battery terminals at the characteristic output voltage of the controlled battery until the energy source is substantially depleted of the first reserve of energy, and then to maintain a second output voltage for a first duration of time using a second reserve of energy.

8. The controlled battery of claim 7, wherein the first duration of time is a period of time based on one or more regulations or laws.

9. The controlled battery of claim 7, wherein the second output voltage is below a low battery warning voltage of the electrical device.

10. A method of controlling a smoke detector by regulating an output voltage from a controlled battery, the method comprising:

outputting a first voltage from the controlled battery, the first voltage being a voltage sufficient to operate the smoke detector without putting the smoke detector into a low battery warning state;

determining that the controlled battery lacks sufficient power to continue to supply the first voltage to the smoke detector; and in response to determining that the controlled battery lacks sufficient power, supplying a second voltage from the controlled battery, the second voltage being a voltage that would cause the smoke detector to go into the low battery warning state for at least a first duration of time.

* * * * *